US008115163B2

(12) United States Patent
Tsai et al.

(10) Patent No.: US 8,115,163 B2
(45) Date of Patent: Feb. 14, 2012

(54) ENCODER HAVING OIL MIST PREVENTION STRUCTURE

(75) Inventors: Chin-Shiong Tsai, Taoyuan Shien (TW); Hong-Cheng Sheu, Taoyuan Shien (TW); Mi-Tien Tsai, Taoyuan Shien (TW); Chun-Chin Su, Taoyuan Shien (TW)

(73) Assignee: Delta Electronics, Inc., Taoyuan (TW)

( * ) Notice: Subject to any disclaimer, the term of this patent is extended or adjusted under 35 U.S.C. 154(b) by 336 days.

(21) Appl. No.: 12/609,508

(22) Filed: Oct. 30, 2009

(65) Prior Publication Data

US 2011/0102895 A1  May 5, 2011

(51) Int. Cl.
*G01D 5/34* (2006.01)
(52) U.S. Cl. ................ 250/231.13; 250/239
(58) Field of Classification Search ............ 250/221, 250/231.13, 239, 577; 384/100–123, 130–133; 29/898.02; 341/13; 340/605, 555–557
See application file for complete search history.

(56) References Cited

U.S. PATENT DOCUMENTS 6,513,979 B2 * 2/2003 Mori et al. ............... 384/107

* cited by examiner

*Primary Examiner* — Que T Le
(74) *Attorney, Agent, or Firm* — Chun-Ming Shih; HDLS IPR Services

(57) ABSTRACT

An encoder having an oil mist prevention structure includes: an encoding body including a cylindrical base, a light emitter and a secondary encoding piece; an oil-containing bearing received and fixed in the cylindrical base; a shaft penetrating the oil-containing bearing to protrude beyond an end surface of the bearing; a rotary disk fixed onto the shaft to cover one side of the secondary encoding piece; a light acceptor fixed to the cylindrical base to correspond to the light emitter and the secondary encoding piece, thereby receiving the signals emitted by the light emitter; and an oil mist prevention structure including a mask integrally formed with the shaft and exposed beyond an end surface of the bearing and a ring extending from the mask for covering an outer periphery of the bearing.

11 Claims, 6 Drawing Sheets

ENCODER HAVING OIL MIST PREVENTION STRUCTURE

BACKGROUND OF THE INVENTION

1. Field of the Invention

The present invention in general relates to an oil mist prevention structure, in particular, to an oil mist prevention structure for encoder.

2. Description of Prior Art

The main purpose of a rotary encoder is to measure the rotary angles, which is comprehensively applied in automatic control system to provide the system with signals of angular positions, whereby a determination of control is made. For example, in a server motor for a driving purpose, the motor responsible for executing the position and speed orders sent out by the system is arranged an encoder on the shaft as a position sensor. By so doing, the positioning accuracy of the server motor is dependent on the resolution of the encoder. In general, the rotary encoder is mainly divided into two kinds: the magnetic encoder and the optical encoder.

Through magnetic force to generate impulse series as signals, a magnetic encoder is easily influenced by dust, oil mist and vapor, so its measuring resolution originated from sensing the variation of magnetic force is still low. On the other hand, by emitting parallel light beams passing through light and dark gratings on a glass disk to generate 0 and 1 signals, an optical encoder has a relatively high resolution for distinguishing and measuring purposes. However, this kind of encoder is more sensitive to the contamination caused by oil mist, vapor and dust.

As shown in FIG. 1, an optically rotary encoder mainly includes an encoding body 10a, a pair of oil-containing bearings 20a, a shaft 30a, a rotary disk 40a and a light acceptor 52a, in which the encoding body 10a is arranged specific components, such as, a light emitter 12a and a secondary encoding piece 20; the oil-containing bearings 20a are arranged in a central hole of the encoding body 10a; the shaft 30a penetrates the oil-containing bearing 20a; the light acceptor 52a is fixed onto the encoding body 10a to correspond to the light emitter 12a and the secondary encoding piece 13a. By so doing, the parallel light beams generated from the light emitter 12a passes through the rotary disk 40a and the fixedly secondary encoding piece 13a to reach the light acceptor 52a. The strength of the light beam generated from the light emitter 12a and received by the light acceptor 52a is varied differently according to the different positions of the rotary disk 40a. Through detecting the signal variation generated by the light acceptor 52a, the positional information can be obtained.

However, according to the optical encoder of most kinds of prior arts is usually arranged one to two pieces of oil-containing bearings 20a therein to enhance the smoothness and stability of the rotary disk 40a when rotating. But, the use of oil-containing bearing 20a will heat the lubricant to be vaporized into oil mist, which will contaminate the rotary disk 40a and the secondary encoding piece 13a during rotation. Or, when the encoder is operating, the lubricant of the bearing 20a will splash onto the rotary disk 40a or the secondary encoding piece 13a, causing the optical encoder outputting inferior or erroneous signals.

In addition, in current practice, most optical encoders use a cylindrical shaft 30a and are fixed onto the bearing 20a by adhesive by means of interfering cooperation. By so doing, when knocked and beaten by external force in axial direction, it is very likely that the shaft 30a generates a displacement to damage the encoder, which is a problem needed to be solved urgently.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve aforementioned problems, the invention is mainly to provide an encoder having an oil mist prevention structure, which can indeed prevent the rotary disk or the secondary encoding piece from a contamination caused by the lubricant splashing from the oil-containing bearings, thus, further ensuring the stability of the signal transmission of the encoder.

Secondly, the invention is to provide an encoder, having an oil mist prevention structure, including an encoding body, an oil-containing bearing, a shaft, a rotary disk, a second sensor and an oil mist prevention structure. The encoding body includes a cylindrical base, a first sensor fixed to the cylindrical base and a secondary encoding piece corresponding to the first sensor and fixed to the cylindrical base. The oil-containing bearing is received and fixed in the cylindrical base. The shaft penetrates the oil-containing bearing to protrude beyond an end surface of the bearing. The rotary disk is fixed onto the shaft by being actuated to each other and covers one side of the secondary encoding piece. The second sensor is fixed to the cylindrical base to correspond to the first sensor and the secondary encoding piece, thereby sensing the signals emitted by the first sensor. The oil mist prevention structure includes a mask integrally formed with the shaft and exposed beyond an end surface of the bearing and a ring extending from the mask for covering an outer periphery of the bearing.

Regarding to the merits possessed by the invention, first of all, the mask has a covering function to the splashing lubricant, making the blocked lubricant flow back to the bearings to continue lubricating, such that the using lifespan of the oil-containing bearing can be prolonged. Secondly, since the positioning-and-restraining ring imposes wedging function on the mask and the bearings, the bearing is enhanced a capability of resisting any axial load.

BRIEF DESCRIPTION OF DRAWING

The features of the invention believed to be novel are set forth with particularity in the appended claims. The invention itself, however, may be best understood by reference to the following detailed description, which describes a number of embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of embodiments, not used to limit its executing scope. Any equivalent variation and modification made according to appended claims is all covered by the claims claimed by the present invention.

Figure 1:
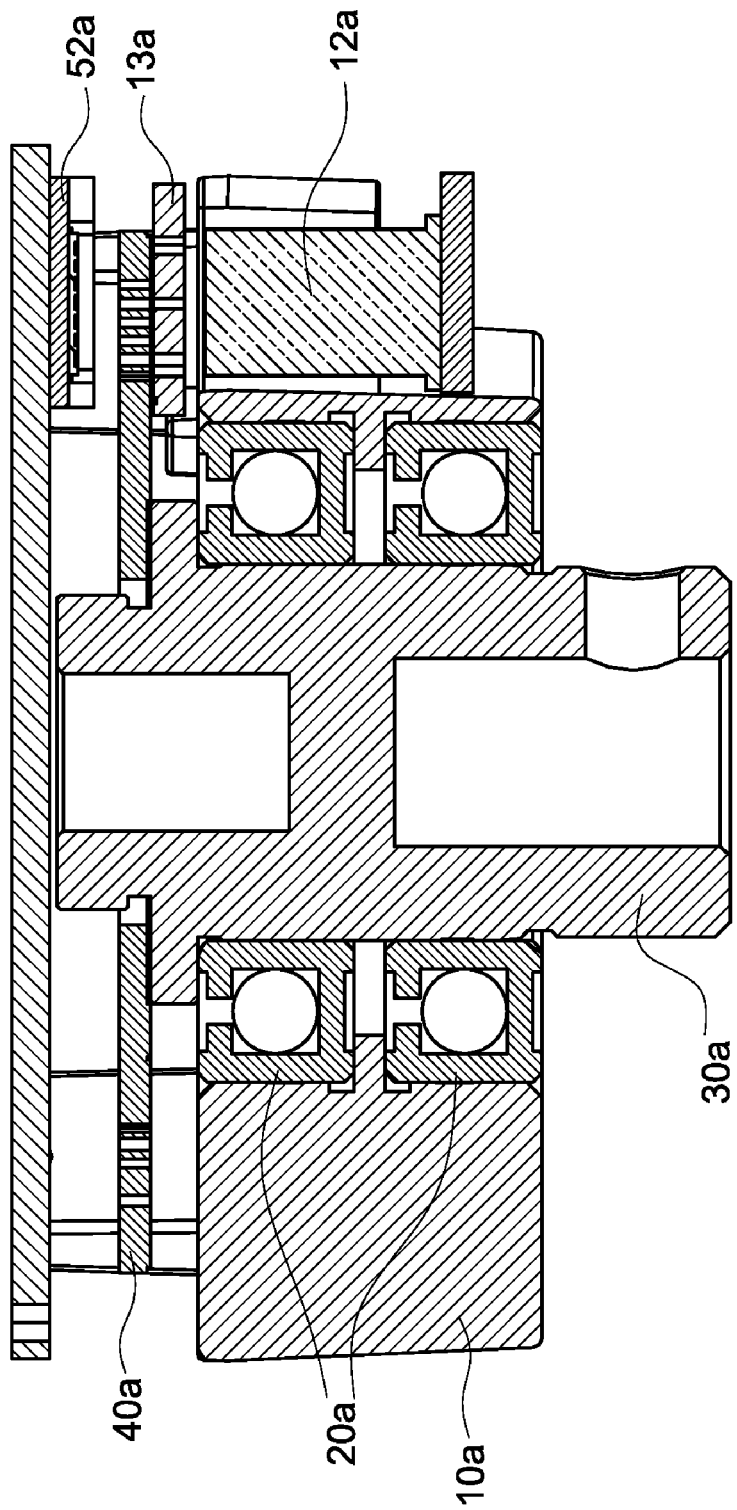
FIG. 1 is an assembled and cross-sectional view of an encoder according to the present invention.
Figure 2:
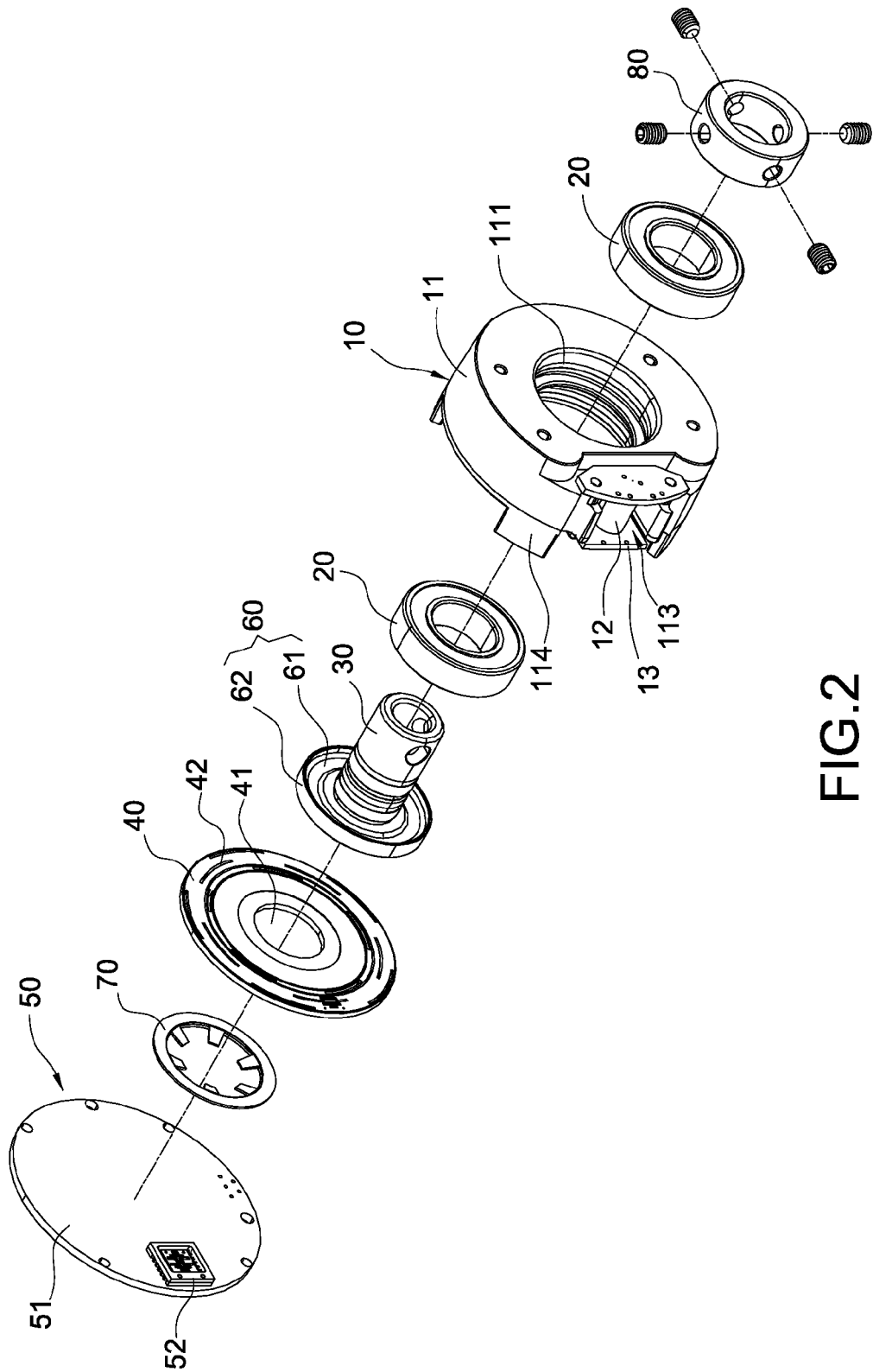
FIG. 2 is a perspective and explosive view of an encoder according to the present invention.
Figure 3:
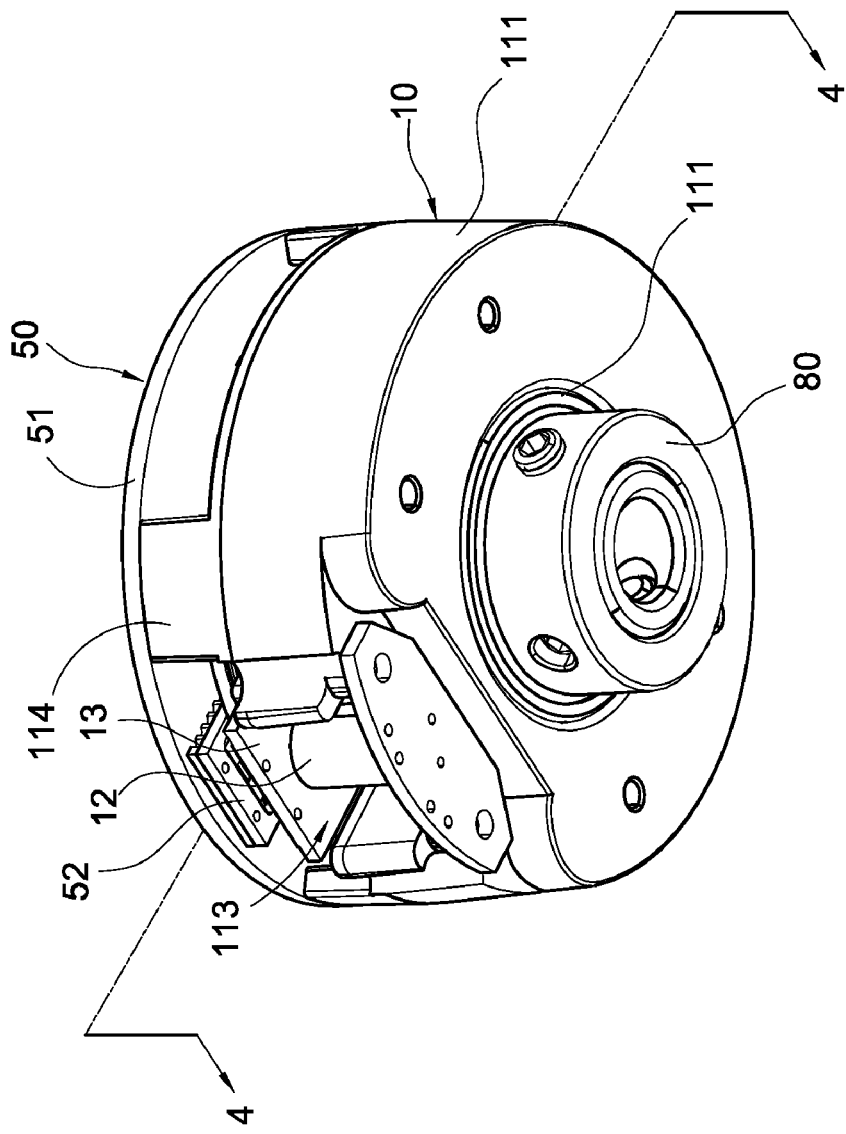
FIG. 3 is an assembled illustration of an encoder according to the present invention.
Figure 4:
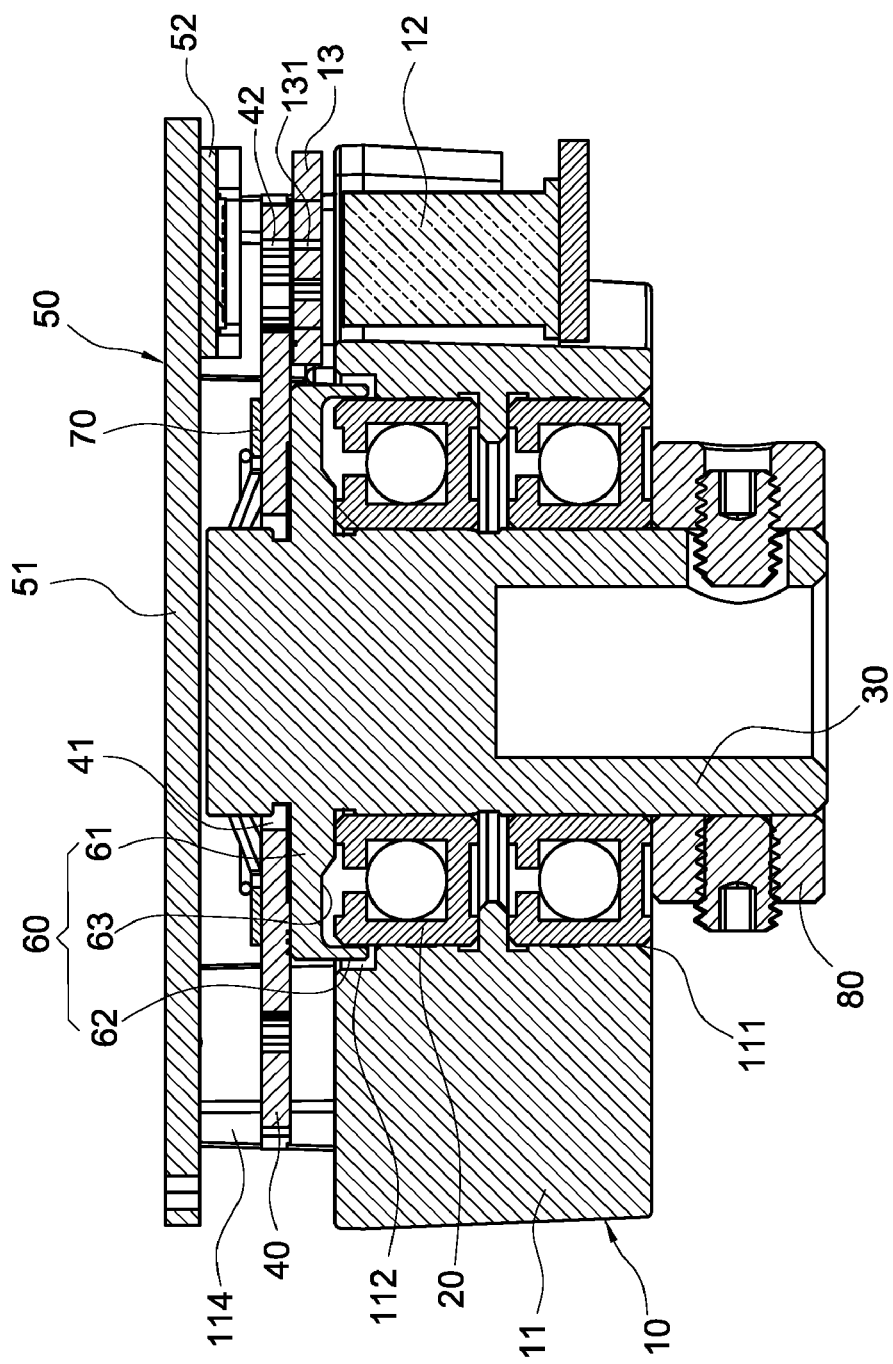
FIG. 4 is a cross-sectional view along the sectional line "4-4" in FIG. 3.

As shown in FIG. 2 through FIG. 4, the invention is to provide an encoder, having an oil mist prevention structure, mainly including an encoding body 10, a pair of oil-containing bearings 20, a shaft 30, a rotary disk 40, a second sensor 50 and an oil mist prevention structure 60.

The encoding body 10 is mainly comprised of a cylindrical base 11, a first sensor 12 and a secondary encoding piece 13. This cylindrical base 11 has a central hole 111. As shown in FIG. 4, an accommodation trough 112 communicated with the central hole 111 is arranged at the rear end surface of the cylindrical base 11. In addition, a lateral trough 113 is arranged at a lateral side of the cylindrical base 11, while a plurality of brackets 114 are extended from the back face of the cylindrical base 11. In this embodiment, the first sensor 12 is a light emitter, which is accommodated fixedly in the lateral trough 113 of the cylindrical base 11, and which is mainly comprised of a luminary and a power supply (not shown in the figures) supplying power to the luminary. The secondary encoding piece 13 can be made of a material of stainless steel or glass, on which a plurality of trough holes 131 are arranged and disposed according to the light-emitting range of the first sensor 12. In this case, these trough holes 131 are fixed above the lateral trough 113 of the cylindrical base 11.

In this embodiment, the oil-containing bearing 20 can be a ball bearing, however, not limited to this configuration only, other kinds of bearing being able to be conceivable as well. By a tightly fitting manner, two oil-containing bearings of same size can be pressed into the central hole 111 of the cylindrical base 11.

In this embodiment, the shaft 30 is integrally formed with the oil mist prevention structure 60. A disk-shaped mask 61 is extended outwardly from an end side of the shaft 30. At an outer periphery of this mask 61, a circular ring 62 is extended toward the front side. As shown in FIG. 4, an escape groove 63 is arranged inside the adjacency of the mask 61 and the ring 62, whereby it can avoid a biasing phenomenon due to the interference during assembling. This shaft 30 penetrates the center of the oil-containing bearing 20, such that the inside face of the mask 61 is closely contacted with the lateral face of the oil-containing bearing 20. By so doing, the inner face of the ring 62 covers the outer periphery of the oil-containing bearing 20.

The rotary disk 40 can also be made of a material of stainless steel or glass, on a center of which a through hole 41 is arranged, on an outer periphery of which a plurality of arc troughs 42 are arranged and interspaced to each other on the disk face. By means of an elastic leaf spring 70, this rotary disk 40 is fixed and wedged onto the outer end face of the mask 61. The part of the rotary disk 40 projected beyond the mask 61 masks over the secondary encoding piece 13. In addition, these arc troughs 42 are arranged and disposed by corresponding to the trough holes 131 of the secondary encoding piece 13 and the luminary 121.

In this embodiment, the second sensor 50 is a light acceptor, mainly including a plate body 51 and a reception unit 52 fixed to the plate body 51. This plate body 51 is fixed onto the bracket 114 of the cylindrical base 11 by means of screwing element, such as, screw. The reception unit 52 is disposed by corresponding to the light-emitting unit 12 and the secondary encoding piece 13 for receiving the light signals emitted from the first sensor 12.

In addition, the invention further includes a positioning-and-restraining ring 80 fitted to one side of the shaft 30 far away from the mask 61 for wedging each oil-containing bearing 20 between the mask 61 and the positioning-and-restraining ring 80 for enhancing the capability of the shaft 30 to resist the axial load.

Figure 5:
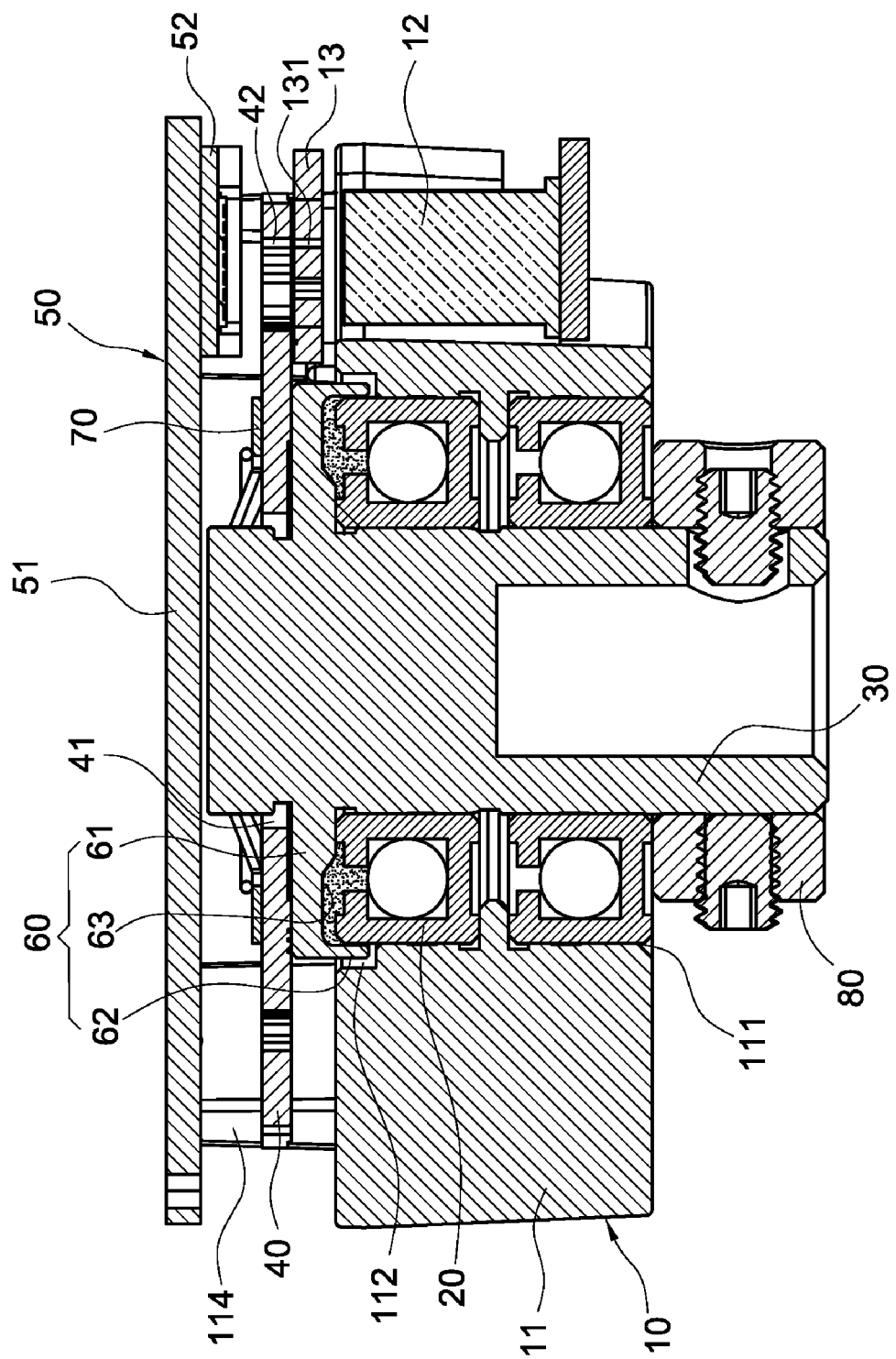
FIG. 5 is an illustration of the using status of an encoder according to the present invention; and, FIG. 6 is a perspective and explosive view of an encoder according to another embodiment of the present invention.

Please refer to FIG. 5. By the assembly of aforementioned components, during using, a motor shaft (not shown in the figures) penetrates the inner hole of the shaft 30 and is forcedly connected by screws. When the shaft 30 is rotated into high speed, the oil-containing bearing 20 is heated. The lubricant contained therein is swelled due to the heat and actuated by the centrifugal force generated by the rotation, so some of the lubricant are discharged and splash out along the holes and gaps of the oil-containing bearing 20. Blocked by the mask 61 and masked by the ring 62, these discharged lubricants are sealed between the oil-containing bearing 20 and the oil mist prevention structure 60. Therefore, the splashing lubricant won't contaminate the rotary disk 40 to effectively ensure the stability of the signals transmitted by the rotary disk 40 and the secondary encoding piece 13. Furthermore, it can help the splashing lubricant flow back to the bearing 20 to continue a lubrication function, whereby the using lifespan of the oil-contained bearing 20 is prolonged.

Figure 6:
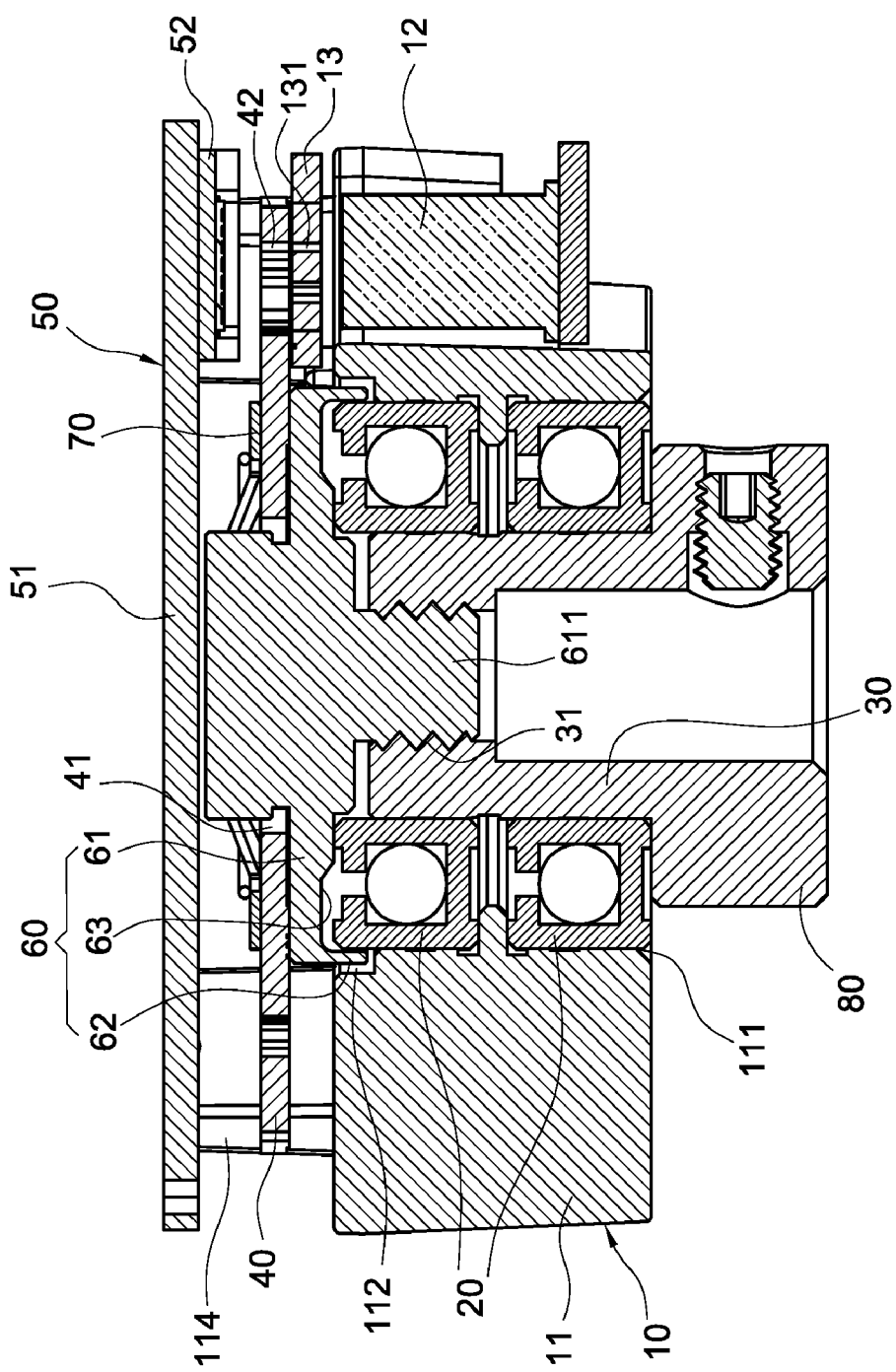

Please refer to FIG. 6, which is a perspective and explosive view of an encoder according to another embodiment of the invention, in which the shaft 30 is arranged a threaded hole 31, while the oil mist prevention structure 60 further includes a screw 611 protruded from the center of the mask 61. This screw 611 is engaged with the threaded hole 31, while one side of the shaft 30 far away from the oil mist prevention structure 60 is integrally formed with the positioning-and-constraining ring 80. By so doing, the locking torsion between the shaft 30 and the oil mist prevention structure 60 and the force pressing down the oil-containing bearing 20 can assemble the shaft 30 to a correct position and generate an inner ring pre-pressing the oil-containing bearing 20, further effectively avoiding the bearing 20 from damage caused by inappropriate application of force and overcoming the unsmooth rotation of the bearing 20 or any additional problem of heat generated from friction.

Accordingly, through the constitution of aforementioned assemblies, an encoder having an oil mist prevention structure according to the invention is thus obtained.

Summarizing aforementioned description, the oil mist prevention structure is an indispensably design for an encoder indeed, which may positively reach the expected usage objective for solving the drawbacks of the prior arts, and which extremely possesses the innovation and progressiveness to completely fulfill the applying merits of a new type patent, according to which the invention is thereby applied. Please examine the application carefully and grant it as a formal patent for protecting the rights of the inventor.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:
1. An encoder, having an oil mist prevention structure, including
an encoding body, which includes a cylindrical base, a first sensor fixed to the cylindrical base and a secondary encoding piece corresponding to the first sensor and fixed to the cylindrical base;

an oil-containing bearing, which is received and fixed in the cylindrical base;

a shaft, which penetrates the oil-containing bearing to protrude beyond an end surface of the bearing;

a rotary disk, which is fixed onto the shaft by being actuated to each other and covers one side of the secondary encoding piece;

a second sensor, which is fixed to the cylindrical base to correspond to the first sensor and the secondary encoding piece, thereby sensing the signals emitted by the first sensor; and an oil mist prevention structure, which includes a mask integrally formed with the shaft and exposed beyond an end surface of the bearing and a ring extending from the mask for covering an outer periphery of the bearing.

2. The encoder having an oil mist prevention structure according to claim 1, wherein the cylindrical base has a central hole and an accommodation trough communicated with the central hole, and the accommodation trough is provided for accommodating the ring of the oil mist prevention structure.

3. The encoder having an oil mist prevention structure according to claim 1, wherein the first sensor is a light emitter, while the second sensor is a light acceptor for receiving a light signal by corresponding to the light emitter.

4. The encoder having an oil mist prevention structure according to claim 1, wherein the secondary encoding piece is made of a material of stainless steel or glass.

5. The encoder having an oil mist prevention structure according to claim 1, wherein the shaft is integrally formed with the oil mist prevention structure.

6. The encoder having an oil mist prevention structure according to claim 1, wherein the rotary disk is made of a material of stainless steel or glass.

7. The encoder having an oil mist prevention structure according to claim 1, wherein an escape groove is arranged inside an adjacency of the mask and the ring.

8. The encoder having an oil mist prevention structure according to claim 1, further including an elastic leaf spring, which is wedged fixedly on an end face of the mask.

9. The encoder having an oil mist prevention structure according to claim 1, further including a positioning-and-restraining ring, which is fitted onto one side of the shaft far away from the mask, and which wedges the oil-containing bearing between the mask and the positioning-and-restraining ring.

10. The encoder having an oil mist prevention structure according to claim 1, further including a positioning-and-restraining ring, which is integrally formed with the shaft, and which wedges the oil-containing bearing between the mask and the positioning-and-restraining ring.

11. The encoder having an oil mist prevention structure according to claim 10, wherein the shaft is arranged a threaded hole, and the oil mist prevention structure further includes a screw protruded from the mask and engaged with the threaded hole.

* * * * *